R. Wright.
Stalk Cutter.
N°. 89,824. Patented May 4, 1869.
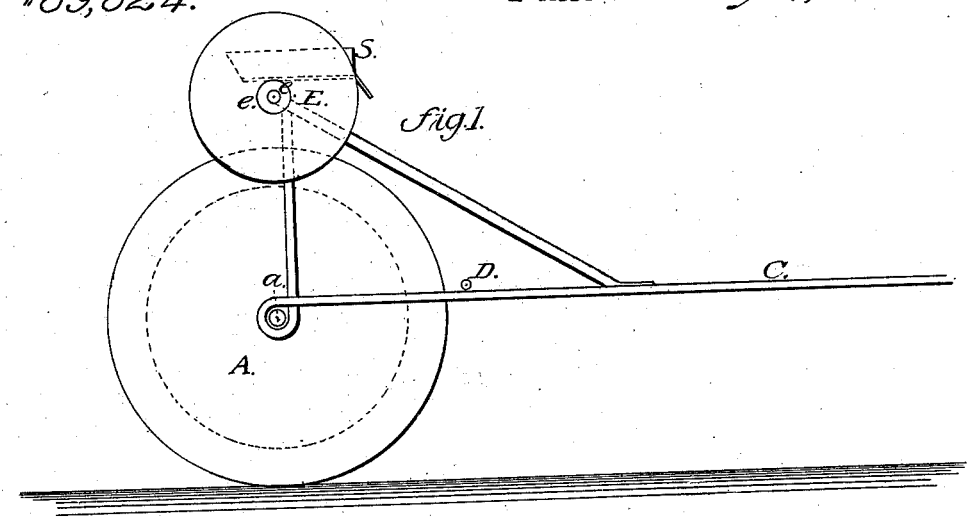
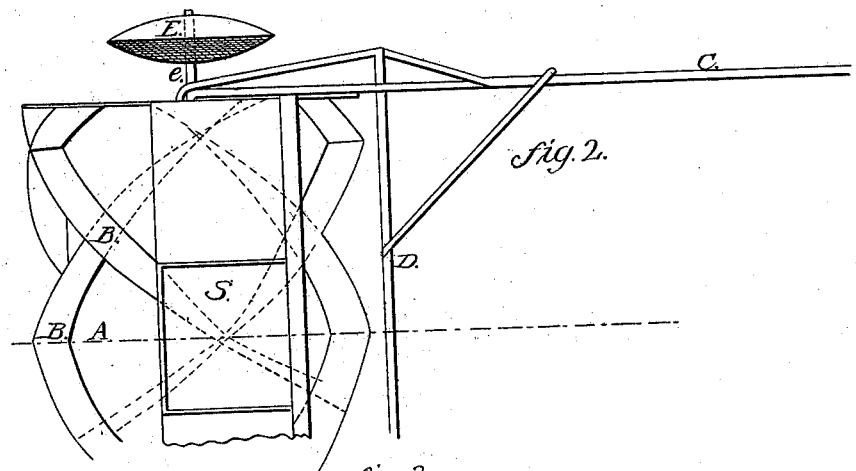
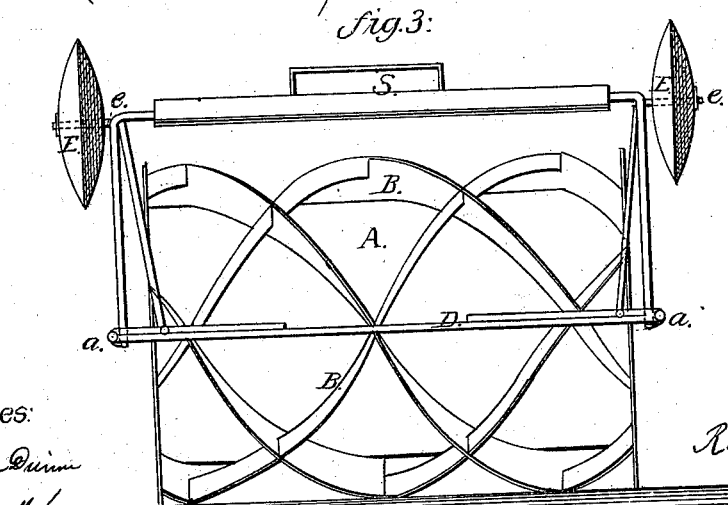
Witnesses:
Inventor:
Reuben Wright R. Wright.
Stalk Cutter.
Nº 89,824.   Patented May 4, 1869.
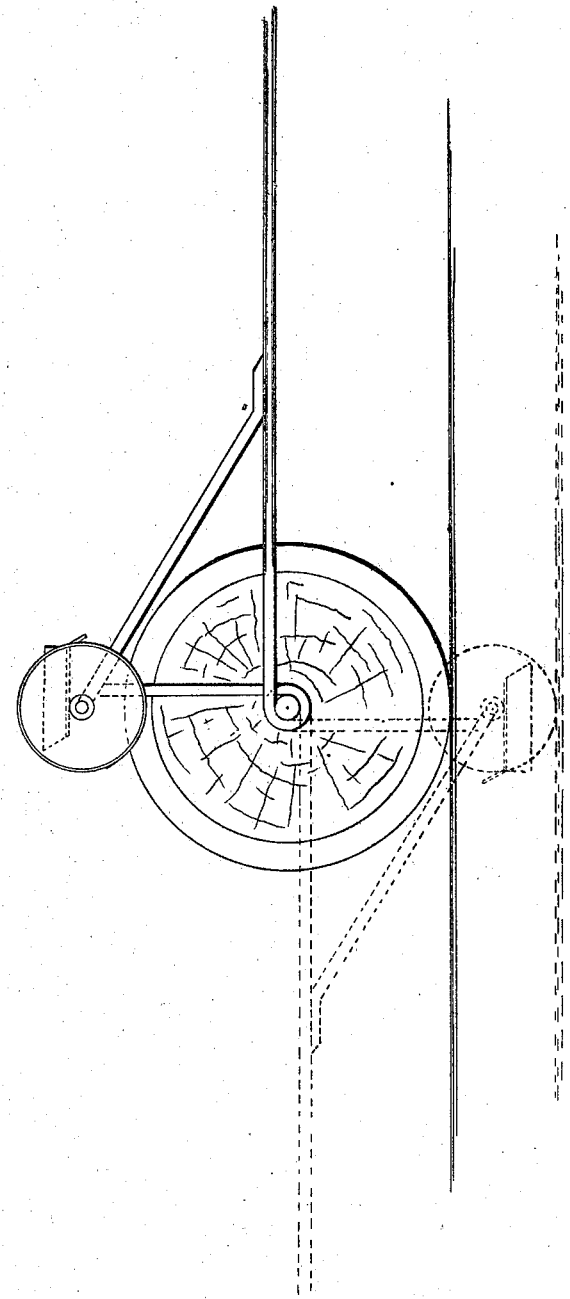

United States Patent Office.

REUBEN WRIGHT, OF HOUSTON, TEXAS.

Letters Patent No. 89,824, dated May 4, 1869.

IMPROVEMENT IN MACHINE FOR CUTTING STALKS IN THE FIELD PREPARATORY TO PLOWING.

The Schedule referred to in these Letters Patent and making part of the same.

*To all whom it may concern:*

Be it known that I, REUBEN WRIGHT, of Houston, in the county of Harris, and in the State of Texas, have invented a new and improved Machine for Clearing Cotton and Corn-Fields of the Stalks after the Crops have been Gathered; and I do hereby declare the following is a full and exact description thereof, reference being had to the accompanying drawings, and to the letters of reference marked thereon.

Figure 1 represents a side elevation of the machine;
Figure 2 a half plan; and
Figure 3 a front elevation.

Like letters denote like parts in the several figures.

The nature of my invention consists in providing a revolving drum or roller with knives, set spirally around it, which cut the stalks of cotton or corn-fields into pieces of any desired length, for the purpose of being plowed under the surface for fertilizing, by rolling it over them.

To enable those skilled in the art to make and use my invention, I will proceed to describe its construction and operation.

A represents a drum or roller, the journals of which revolve, in the eyes of the shafts, at *a*. It is made of wood or metal.

B B represent the two sets of knives, set spirally around the drum, and crossing each other diagonally, as represented in the drawings. The distance at which they are set from each other determines the length into which the stalks may be cut.

C represents the shafts by which the machine is operated. Its thills are made in the shape of levers, the short ends of which stand at a right angle to the long ends which form the shafts proper.

The short arms form supports for the axle of the wheels.

D represents a cross-bar, which extends from one thill of the shafts to the other, in front of the roller. It serves to bear down the stalks.

E E represent the wheels, which are loose on and revolve over the axle *e*. This axle is secured to the ends of the short arms of the shafts.

Secured to the axle, on top of it, is a seat, S, for the driver.

When the machine is in operation, the roller is on the ground; but it is inverted when drawn from one field to another, so that its wheels are on the ground. This is done by throwing the shafts over the roller, by which operation the wheels are brought down on the ground. The drum may then be raised by bearing down on the shafts.

For the sake of economy in the construction of the machine, the wheels may be dispensed with, without rendering it inoperative.

Having thus described my invention,
What I claim, and desire to secure by Letters Patent, is—

The roller A, provided with spiral knives B B, crossing each other diagonally, the cross-bar D, the shafts C, axle *e*, and wheels E E, the whole constructed and arranged to operate substantially as and for the purpose set forth.

REUBEN WRIGHT.

Witnesses:
EMMETT QUINN,
O. E. DUFFY.